UNITED STATES PATENT OFFICE.

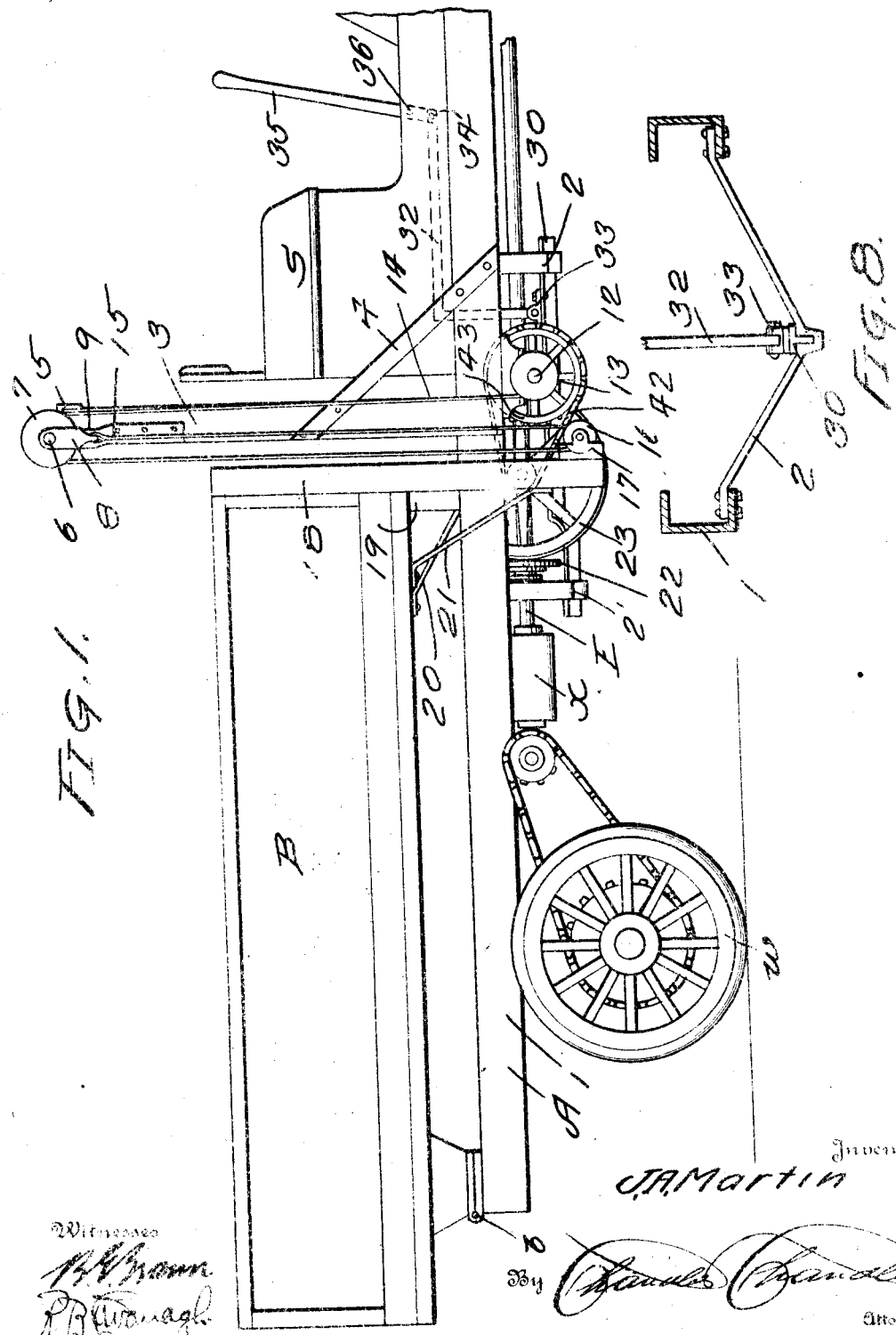

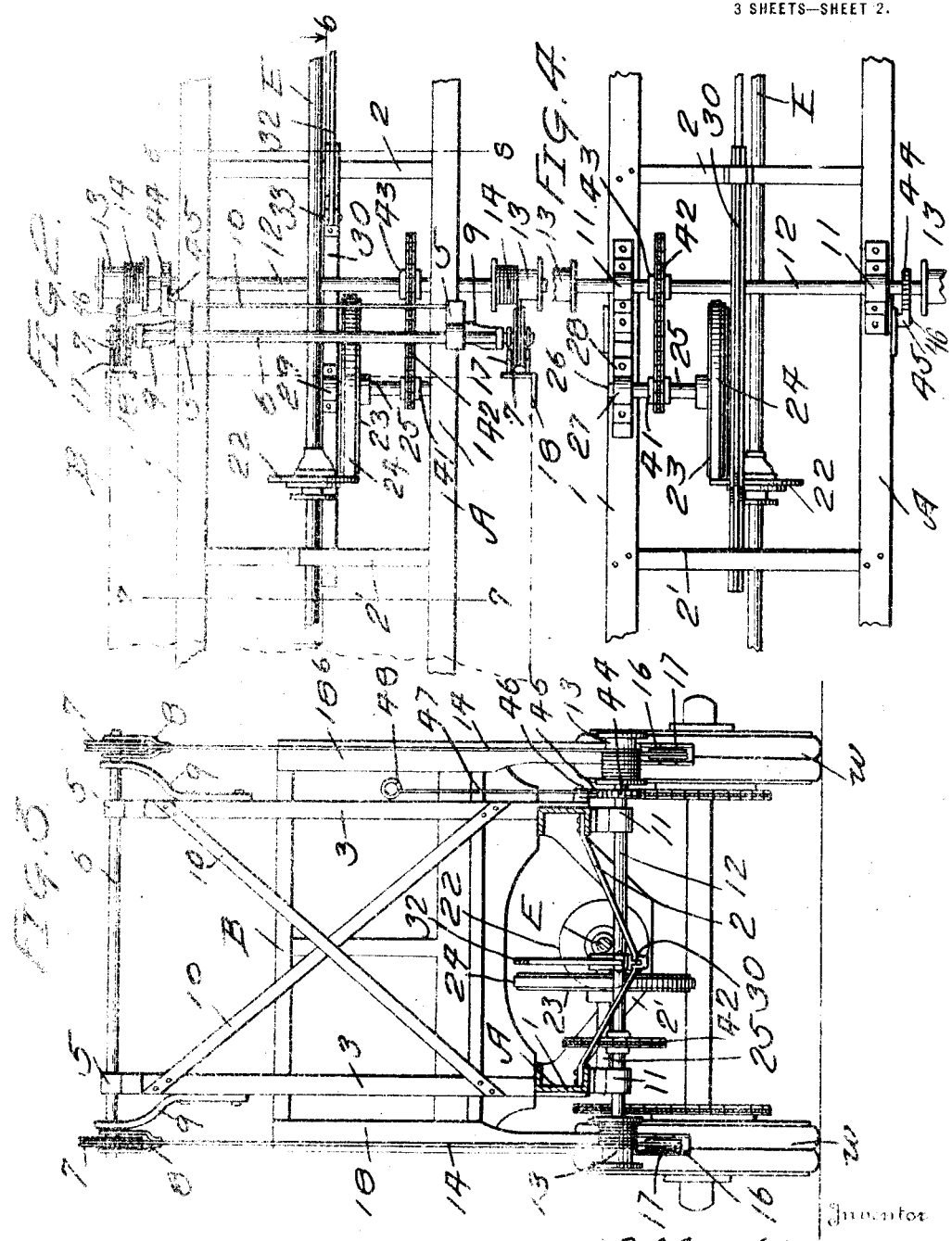

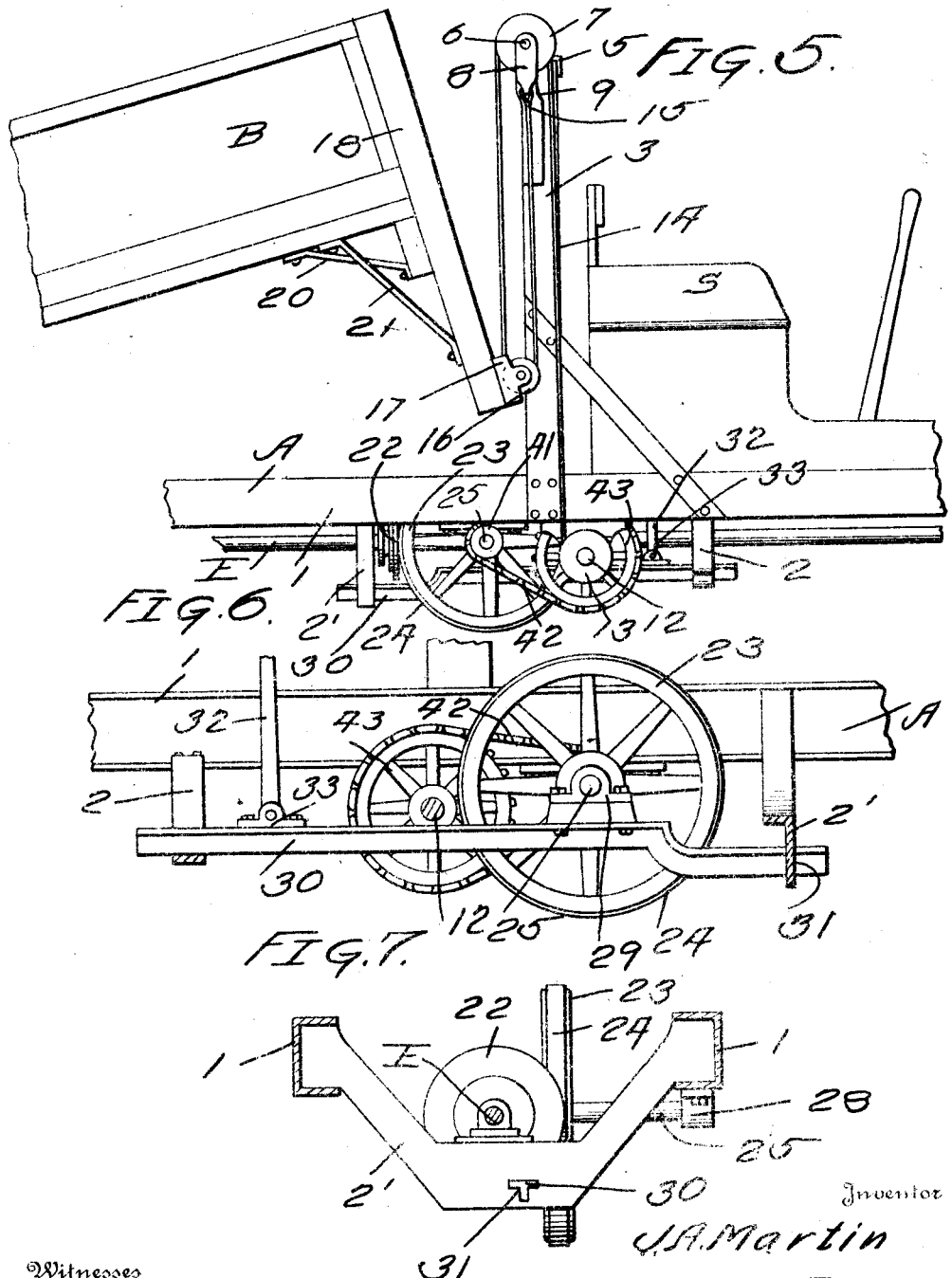

JOSEPH A. MARTIN, OF WOODLAWN, MARYLAND.

DUMPING-TRUCK.

1,195,489.  Specification of Letters Patent.  Patented Aug. 22, 1916.

Application filed February 2, 1915. Serial No. 5,697.

*To all whom it may concern:*

Be it known that I, JOSEPH A. MARTIN, a citizen of the United States, residing at Woodlawn, in the county of Baltimore, State of Maryland, have invented certain new and useful Improvements in Dumping-Trucks; and I do hereby declare the following to be a full, clear, and exact description of the invention, such as will enable others skilled in the art to which it appertains to make and use the same.

This invention relates to dumping trucks, and has particular application to mechanism for operating the tilting or dumping body of an automobile truck.

In the present instance it is my purpose to provide an automobile truck wherein the mechanism for operating the tilting or dumping body has the power necessary for its operation transmitted thereto from the main drive shaft of the vehicle, this shaft being driven from the engine in the usual manner.

A further object of the invention is the provision of mechanism which is employed not only for the purpose of raising and tilting or dumping the pivoted body of the truck, but after dumping, such mechanism functions to control the return or descent of the wagon body to its normal position on the bed or frame of the truck, thereby obviating the necessity of employing a separate and distinct braking device for preventing the too rapid return of the wagon body to its horizontal position on the truck bed. Furthermore, I propose to provide dumping mechanism, through the agency of which the truck body may be rapidly elevated and tilted to discharge its load, and then lowered and restored to its normal position on the truck bed, and at the same time the elements constituting my invention are so constructed and arranged that sudden jars and shocks, strains and stresses on the working parts are avoided, and the consequent necessity of frequent repairs due to the breaking or injury to the parts, is obviated. I also aim to provide a dumping truck which will embody the desired features of simplicity, efficiency, durability and convenience.

With the above recited objects and others of a similar nature in view, my invention consists in the construction, combination and arrangement of parts set forth in and falling within the scope of the appended claims.

In the accompanying drawings: Figure 1 is a view in side elevation of an automobile truck embodying my invention. Fig. 2 is a top plan view of the forward portion of the truck and illustrating the dumping mechanism. Fig. 3 is a view in front elevation of the dumping mechanism. Fig. 4 is a bottom plan view of the power transmission mechanism between the main drive shaft of the engine and the dumping mechanism. Fig. 5 is a view in side elevation of the front portion of the truck and showing the body in tilted or dumping position. Fig. 6, is a longitudinal sectional view taken on the line 6—6 of Fig. 2 looking in the direction of the arrow. Fig. 7 is a cross sectional view taken on the line 7—7 of Fig. 2. Fig. 8 is a cross sectional view taken on the line 8—8 of Fig. 2.

Referring now to the accompanying drawings in detail, the letter A indicates the frame or bed of the truck, and B is the tilting body or dumping box which is pivoted at *b* to the rear of the bed. The traction wheels are shown at W and the seat located on the forward end of the bed is indicated at S. The bed or frame A is preferably constructed with the side sills 1, in the nature of channel girders or beams, having V-shaped cross bars 2 and 2' connecting them. The main drive or engine shaft is indicated at E and extends longitudinally beneath the bed in the usual manner, this shaft being adapted to be driven by any suitable form of engine or motor transmission indicated at X. Bolted to each sill 1 is an upright or standard 3, also preferably made of channel iron, the two standards being arranged diametrically opposite to each other, and each standard is further braced by being connected with the channel girder through a forwardly extended diagonal brace 4. The upper free end of each standard is equipped with a bearing box 5, and in these boxes is fastened the cross shaft 6, the outer ends of which project beyond the standards 3. Loose on each end of the shaft is a pulley 7 spanned by a U-shaped hanger 8, which is also hung from this shaft 6. Bearing brackets 9 are fastened to the outer sides of the standards 3, and through the upper ends of these brackets the end portions of the shaft passes, the brackets serving to brace and support the end portions of the shaft 6 which project beyond the standards 3. These standards 3 are further braced through being connected with each other by the diagonal cross braces 10.

Suspended from the under side of the sills 1 are oppositely disposed bearing boxes 11, and journaled in these boxes is a shaft 12 which extends crosswise of the bed A. Fast with the ends of this shaft are the spools 13. Two wire cables 14 have their tail ends 15 fastened at the bight portions of the hangers 8, these cables leading down and around pulleys 16 journaled in bearings 17 at the lower ends of the vertical leg bars 18 at the front of the truck body B, the cables then leading upward and around the pulleys 7 on the shaft 6, thence downward to the drums or spools 13, to which the other or head ends of the cables are fastened in the usual manner. The legs 18 of the body B are preferably made of angle bars and are fastened to the body in such manner as to constitute corner irons for the front corners thereof, the lower portions of the bars extending to points adjacent the ground line, as will be clearly seen in Figs. 1 and 3. Beneath the front end of the bottom of the body extends the cross beam 19, while brace irons 20 extend between this beam and the floor of the body B. I also provide diagonal braces 21 having their upper ends fastened to the bottom of the body B and their lower ends secured to the lower portion of the angle legs 18.

Fast with the main drive shaft E is a friction disk 22 adapted, as hereinafter described, to frictionally contact with and drive the friction gear wheel 23, the latter preferably having a fiber tire 24 to increase the frictional engagement of the wheel and disk. This friction wheel 23 is fast on the counter shaft 25, the outer end 26 of which is swiveled at 27 in the bearing 28 depending from the adjacent sill 1. The inner end portion of this counter shaft 25 extends through the friction wheel 23 and finds bearing in the box 29 fast with the sliding rail 30, the forward end of which slides on the central portion of the V-shaped cross bar 2, while the rear end slides through the opening 31 in the cross bar 2'. Thus it will be seen that by slightly shifting or sliding the rail 30, the wheel 23 may be moved into and out of frictional engagement with the disk 22 on the main drive shaft E, this movement being permitted because the opposite or outer end of the counter shaft is swiveled. To shift the sliding rail 30, I provide an angle arm 32 which is pivotally connected to the rail at 33, the outer end of the horizontal section of the arm being pivotally connected at 34 to the lower end of the hand or operating lever 35, which latter is fulcrumed on the pivot 36, this operating or hand lever 35 extending through the floor of the truck and being located within convenient reach of a person occupying the seat S. By means of the angle arm connection between the hand lever 35 and the sliding rail 30, it will be seen that when the lever is shifted in one direction, for instance forward, the friction wheel 23 will be moved into engagement with the disk 22, while when it is pulled in the opposite direction or rearward, the friction wheel will be thrown out of engagement with the disk 22. When the two friction gear members 22 and 23 are in contact so that they are driven from the drive shaft E motion is imparted to the shaft 25. Fast with this shaft is a small sprocket wheel 41, which when driven imparts motion through the endless drive chain 42 to the large sprocket wheel 43, fast on the shaft 12 carrying the drums or spools 13 for the cables 14. Therefore, with the rotation of the shaft 12 in one direction the cables 14 will be wound on the spools 13, and as these cables are reeved through the pulleys 16, carried by the vertical leg bars 18 of the truck body B, the latter will be elevated at its forward end, swinging on its pivot or fulcrum point b, and with this tilting movement of the wagon body the load will be dumped. To hold the drum shaft 12 and consequently the drums or spools 13 against reverse or cable unwinding rotation during the operation of elevating or tilting the body B, I provide the shaft with a ratchet wheel 44 adapted to be engaged by a pawl 45 which when interlocking with the teeth of the ratchet wheel will prevent the backward rotation of the latter and its shaft 12. This pawl, which is pivoted at 46 may be released from locking engagement with the ratchet wheel by the act of the driver pulling the wire or cable 47 connected to the locking pawl, this cable being provided with a suitable handle 48. When the pull on the cable 47 is released the pawl drops by gravity into locking engagement with its ratchet wheel. Now, after the body B has been tilted and dumped it is, of course, desirable to bring it back to its normal, horizontal, load-receiving position on the bed of the truck, and this should be accomplished without permitting the too rapid descent or dropping of the forward portion of the body, as otherwise the shock or jar incident to the relatively heavy truck body striking the bed of the truck will be liable to damage and injure the equipment. I, therefore, control the descent or return of the body B to its position on the bed of the truck through the same mechanism by which the body is elevated, thereby dispensing with the use of extra braking devices which would add to the cost and weight of the truck and complicate the construction and operation.

In returning the wagon body to the bed, the friction gear 23 is held in engagement with the disk 22 with just sufficient light pressure to act as a brake, and while allowing the body to descend slowly by gravity, the pressure between the two friction parts is not sufficient to cause the raising of the body. Consequently when the winding tension on the cables 14 is released the forward end of the body will drop by gravity toward the bed of the truck, the cables unwinding as the body falls. The speed of descent of the body is, of course, controlled and checked by the frictional engagement of the gear wheel 23 with the disk 22, this, of course, preventing the drum or spool shaft 12 from running free under the unreeling of the cables 14 therefrom with the dropping of the body B. In other words, these cables 14 cannot reel off their drums or spools any faster than the operator desires, as he controls the unwinding action by pressing the gear wheel 23 in contact with the disk 22, by means of the lever 35.

It will further be noted that the dumping body may be held and locked in any position to which it is tilted or elevated by means of the pawl and ratchet mechanism on the drum shaft, as heretofore described.

While I have herein shown and described one particular embodiment of my invention I wish it to be understood that I do not confine myself to all the precise details of construction herein set forth by way of illustration, as modification and variation may be made without departing from the spirit of the invention or exceeding the scope of the appended claims.

What I claim is:

1. In a device of the class described, the combination with a vehicle bed having a tilting body thereon, and hoisting mechanism therefor, of a power shaft, a friction disk thereon, a shiftable counter-shaft, a friction wheel provided with a fiber tire carried by the counter-shaft, a lever for shifting one end of the counter-shaft to move the friction wheel into and out of frictional engagement with the disk on the power shaft, a sprocket on the counter-shaft, a drum shaft having a drum thereon, a sprocket mounted on the said drum shaft, a chain connecting both of said sprockets, a ratchet and pawl connected with the drum shaft to hold the latter against rotation, and an operating cable for the pawl, said hoisting mechanism having a running connection with the said drum shaft.

2. In a device of the class described, the combination with a vehicle bed having a tiltable body thereon, and lifting mechanism therefor, of a power shaft, a friction disk thereon, a shiftable counter-shaft, a friction wheel carried by the counter-shaft, a sliding bar having a bearing for receiving the movable end of the shiftable counter-shaft, a lever connected to the sliding bar to move the friction wheel into and out of frictional engagement with the disk on the power shaft, a drum shaft having a drum thereon, flexible connection between the shiftable counter-shaft and the said drum shaft, and a ratchet for the drum shaft whereby the latter may be held against rotation for the purpose set forth.

In testimony whereof, I affix my signature, in the presence of two witnesses.

JOSEPH A. MARTIN.

Witnesses:
 Edw. S. Martin,
 C. P. Eloerkin.